(Model.)

J. GOODMAN.
PLANIMETER.

No. 500,202. Patented June 27, 1893.

Attest:
Geo. H. Potts
C. J. Sawyer

Inventor:
John Goodman
By Philipp Phelps Horny
Attys

UNITED STATES PATENT OFFICE.

JOHN GOODMAN, OF LEEDS, ENGLAND.

PLANIMETER.

SPECIFICATION forming part of Letters Patent No. 500,202, dated June 27, 1893.

Application filed September 19, 1890. Serial No. 365,449. (Model.) Patented in England April 22, 1890, No. 6,087.

*To all whom it may concern:*

Be it known that I, JOHN GOODMAN, a subject of the Queen of Great Britain, residing at Leeds, in the county of York, England, have invented certain new and useful Improvements in Planimeters, fully described and represented in the following specification and the accompanying drawings, forming a part of the same, the said improvements being embraced in application for British Letters Patent No. 6,087, filed April 22, 1890.

This invention relates to improvements in planimeters for measuring areas, computing weights, &c., and especially to that class of planimeters, in which the instrument consists of a beam, a tracing point which is moved around the boundary of the area to be measured, and a hatchet by which the area of the figure traced is recorded by dents made at the commencement and completion of the tracing movement, the distance included between these dents being afterward measured and the area calculated therefrom. With instruments of this class, as heretofore made, it has been necessary to measure the distance between the dents or marks made by the hatchet, multiply that distance by the length of the instrument and afterward to correct the result by a somewhat tedious calculation, the instrument thus being rendered practically useless to any one but a mathematician, and even then applicable only for comparatively small areas, owing to the liability to error. By my invention I employ an instrument of the same general character, but provide a curved or straight scale so formed that no calculation whatever is needed, but the area of the surface traced is read directly from the scale applied to the dents formed by the instrument, thus avoiding the necessity of special skill in the use of the instrument and rendering it applicable for areas of much greater dimensions than instruments of this class as previously made.

Figure 1:
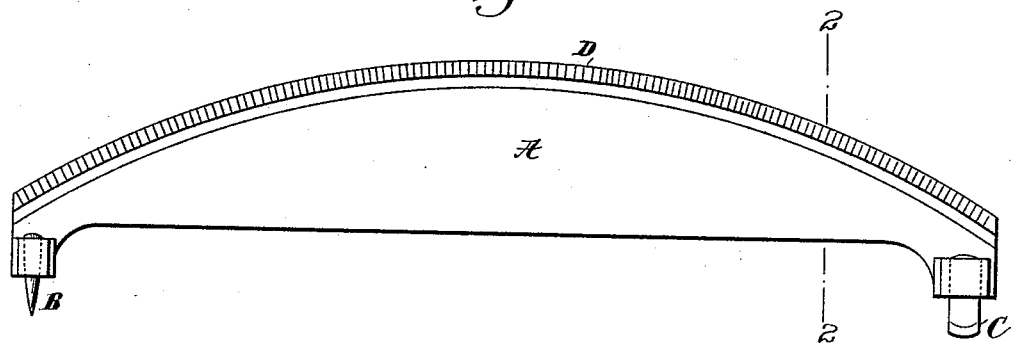
Figure 2:
Figure 4:
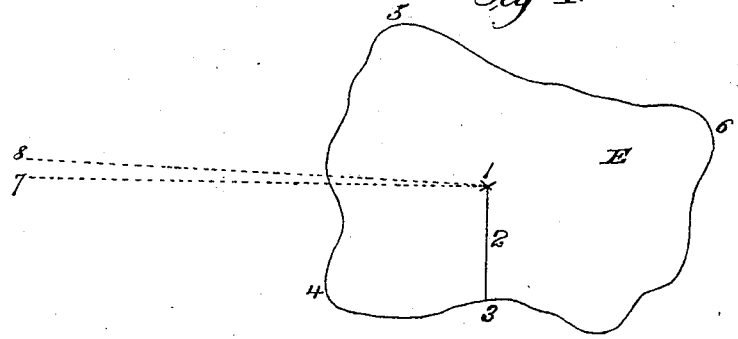
Figure 3:
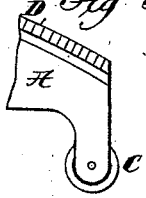

In the accompanying drawings forming a part of this specification, Figure 1 is a side elevation of the preferred form of my invention. Fig. 2 is a cross-section taken on the line 2—2 of Fig. 1. Fig. 3 shows a modification, and Fig. 4 illustrates the method of using the instrument.

Referring to said figures, A is the beam forming the body of the planimeter, B, the tracing point, C, the hatchet, and D the scale. This scale D will preferably, as shown, be placed upon a curved surface formed on or secured to the beam A, but it will be understood that a scale separate from the planimeter may be used, if desired. Fig. 3 shows a similar construction, except that the hatchet C is given the form of a wheel mounted to rotate freely, this construction being evidently the equivalent of that shown in Figs. 1 and 2.

The planimeter having the general construction hereinbefore described, without the curvature and especial division of the scale is described in my application filed September 9, 1891, Serial No. 405,201, for a planimeter.

The beam A may be provided upon its straight edge with an ordinary inch scale, if desired, and the legs by which the tracing point and hatchet are carried may be formed at right angles to the beam A to serve as a square for drawing right angles.

The method of using the instrument is as follows:—Let E, Fig. 4, be the area to be measured. A point 1 is chosen at or near the center of gravity of the area E, and a line 2—which I will call the radial line—is drawn from the central point 1 to any point, 3, of the boundary line, 3, 4, 5, 6 of the figure E. The instrument is held vertical or nearly so, with its tracing point and hatchet both touching the paper, the tracing point being placed at the central point 1, and the hatchet is then pressed into the paper to form a dent, as at 7. The hatchet is then released, allowing the instrument to move freely and the tracing point B is moved from the central point 1 over the radial line 2 to the point 3, then around the boundary line 3, 4, 5, 6 and back over the radial line to the central point. The hatchet is then again pressed into the paper to form a dent in its position at the end of the tracing movement, as at 8. The scale D is then placed upon the two dents 7, 8, and the area of the figure E read off from the scale. The area of the figure E in square inches will be equal to $r^2 \triangledown$, where $r$ is equal to the length in inches of the beam A from the tracing point B to the hatchet C, and $\triangledown$ is the angle, 7, 1, 8 in Fig. 4, estimated in circular measure. If, therefore the length of the beam be twelve inches, and the radius of the scale curve be twelve inches equal $r$, and each division of the scale be made equal to one degree, then each division will correspond to $$\frac{144 \times 3.1416}{180} = 2.5$$

square inches approximately, and the number of square inches in the area measured can be at once read off by the scale divisions.

It will be obvious that the scale may be so divided that each division fills one square inch or a fraction of a square inch, and that, instead of using a curved scale, a straight one may be used in which the divisions have been projected from a curved scale obtained as described. The curved scale, however, is preferred, as the divisions of a straight scale will not be equal.

The method of using the scale has been described, assuming that the point 1 is the exact center of gravity of the figure E. If the central point at which the tracing movement is commenced does not coincide with the center of gravity, the process must be repeated with the instrument turned through one hundred and eighty degrees and the mean of the two areas taken. To obtain great accuracy the area can be measured several times in the manner described and the mean of the areas thus found taken.

My planimeter can be used to obtain the areas of plane irregular figures for all purposes, such as computing the moments of inertia, radii of gyration, modulus of sections with regard to bending or twisting, equations to curves, weights of bodies, &c.

It is apparent that the instrument may be of any material desired and of any convenient shape or length, the calculation of the scale being based upon the length of the scale but independent of any special form or length thereof.

What I claim is—

1. A planimeter provided with a pointed tracer at one end a hatchet having an edge at the other end and an intervening rigid beam, the said beam being graduated to form a scale in units of the area to be calculated substantially as set forth.

2. A planimeter consisting of the beam A having the scale D calculated in units of the area traced by the planimeter, the tracing point B, and the hatchet C, substantially as described.

In testimony whereof I have hereunto set my hand in the presence of two subscribing witnesses.

JOHN GOODMAN.

Witnesses:
EDWARD W. DODGE,
SAML. JENNISON.